United States Patent
Kim et al.

(10) Patent No.: US 7,823,126 B2
(45) Date of Patent: Oct. 26, 2010

(54) ROBOT CONTROL SOFTWARE FRAMEWORK IN OPEN DISTRIBUTED PROCESS ARCHITECTURE

(75) Inventors: Hong-Ryeol Kim, Seoul (KR);
Dae-Won Kim, Seongnam-si (KR);
Hong-Seong Park, Seoul (KR);
Hong-Seok Kim, Seoul (KR); Ho-Gil Lee, Ansan-si (KR)

(73) Assignee: Korea Institute of Industrial Technology (KR)

( * ) Notice: Subject to any disclaimer, the term of this patent is extended or adjusted under 35 U.S.C. 154(b) by 753 days.

(21) Appl. No.: 11/596,311

(22) PCT Filed: May 12, 2005

(86) PCT No.: PCT/KR2005/001391

§ 371 (c)(1),
(2), (4) Date: Aug. 3, 2007

(87) PCT Pub. No.: WO2005/109299

PCT Pub. Date: Nov. 17, 2005

(65) Prior Publication Data

US 2008/0141220 A1     Jun. 12, 2008

(30) Foreign Application Priority Data

May 12, 2004    (KR) ............... 10-2004-0033303

(51) Int. Cl.
*G06F 9/44* (2006.01)
(52) U.S. Cl. .................. 717/120; 717/121; 700/257
(58) Field of Classification Search .......... 700/257; 717/121
See application file for complete search history.

(56) References Cited

U.S. PATENT DOCUMENTS

| 6,088,689 | A | 7/2000 | Kohn et al. ............... 706/10 |
| 6,889,118 | B2 * | 5/2005 | Murray et al. ............ 700/250 |
| 2002/0111965 | A1 * | 8/2002 | Kutter ................... 707/513 |
| 2003/0061021 | A1 | 3/2003 | Sakai et al. ................ 704/1 |

FOREIGN PATENT DOCUMENTS

| KR | 2001-0053322 | 6/2001 |
| KR | 2003-0042219 | 5/2003 |
| WO | WO 03/045639 | 6/2003 |

* cited by examiner

*Primary Examiner*—Wei Y Zhen
*Assistant Examiner*—Phillip H Nguyen
(74) *Attorney, Agent, or Firm*—Ballard Spahr LLP

(57) ABSTRACT

An open distributed processing structured robot control software architecture is enclosed, which makes it possible to manufacture a user-oriented robot through combination of independent heterogeneous functional modules. The invention involves an open software framework for integrated operation and production of distributed software of the modules, and an autonomous robot control architecture suitable for distributed environments. The software framework indicates underlying software components for robot control and service creation. The invention makes it possible to mass-produce autonomous robots in units of interoperable functional modules. It is also possible to meet various demands of consumers, achieve specialization, and accelerate technology development since the development procedures are specialized in an independent manner and are suitable for manufacturing a wide variety of robot products in small quantities.

7 Claims, 4 Drawing Sheets

```
iapi vfh {
    [] int vfh_init();                                              //histGrid map, polhist Memory Allocation & Initialization
    [] int vfh_exit();                                              // delete memory allocation
    [] void histGridUpdate(int sensor[16], int robotX, int robotY, int robotTheta);  //histGrid map UpDate
    [] void pol-HistUpDate();                                       //PolaHistogram UpDate
    [] void freeSpace();                                            // search for empty space in polHistogram
    [] void where_I_must_go(int targetX, int targetY);              // calculate robot direction and speed
    [] int v;                                                       // output robot speed
    [] int theta;                                                   //output robot direction
} module Navigation1 {
    //Handling Function Definition
    []void start (int targetX, targetY);
    [] void stop();
    [] int status();
    //Input Variable Definition
    [] int targetvect[2];
    [] int UltraSensor[16];
    //Output Variable Definition
    []int go [2];
} using Navigation1;
using vfh;

int startFlag = 0;
int stopFlag = 0;
int subGoalX;
int subGoalY;                                                       // destination
int state = 0;                                                      // destination void start (int targetX, int targetY){
    startFlag = 1;
    subGoalX = targetX;
    subGoalY = targetY;
} void stop(){
    stopFlag = 1;
} int status(){
    return state;
} int vfh(int subTargetX, int subTargetY){
//Vector Field Histogram Algorithm
// avoid obstacle while navigating to subTarget
    histGridUpDate(ultraSensor, local.x, local.y, local.theta);     // update histGrid map using ultrasonic sensor
    polHistUpDate();
    freeSpace();
    where_I_must_go(targetvect[0], targetvect[1]);
    // move robot at speed of v in theta direction
    go[0]=v;
    go[1]=theta;
} int subGoalCheck(int subGoalX, int subGoalY){
    int result = 0;
    if( (subGoalX == local.x) && (subGoalY == local.y) )
    {
        result =1;
    }
} void main()
{
    vfh_init();
    while(1)
    {
        while(!startFlag) {}                                        // wait until startFlag is 1
        vfh(subGoalX, subGoalY);
        if(subGoalCheck(subGoalX, subGoalY))
        {
            state = 1;                                              // reach subGoal
            startFlag = 0;                                          // stop Navigation 1
        }
        vfh_exit();     // delete memory allocation at end of navigation
    }
}
```

[Fig. 7]

ROBOT CONTROL SOFTWARE FRAMEWORK IN OPEN DISTRIBUTED PROCESS ARCHITECTURE

CROSS REFERENCE TO RELATED APPLICATIONS

The present application claims priority to Republic of Korea Patent Application No. 10-2004-0033303, filed May 12, 2004, which application is incorporated herein fully by this reference.

TECHNICAL FIELD

The present invention relates to an open distributed autonomous robot control architecture, and more particularly to an open distributed processing structured robot control software architecture, which allows manufacturing of a user-oriented robot through combination of independent heterogeneous functional modules.

BACKGROUND ART

General autonomous robot control software architectures have a 3-tier control architecture having a hybrid form of deliberative control software for achieving intelligence and reactive control software for achieving autonomous reactivity. However, research in the robot control software field has mainly focused on abstract architecture technologies, and a detailed implementation method has not been disclosed.

Middleware technologies for integration of distributed software have so far been developed substantially as technologies for corporation-level computer software such as parallel computer technologies. Thus, most technologies have omitted details of the guarantee of real-time performance required by systems such as robots. Independent communication middleware or independent platform middleware have been disclosed in the prior art, but there has not yet been disclosed an invention relating to middleware that comprehensively includes all layers.

A recent example disclosure of the application of distributed software integration technologies to robots is a method for communication between objects of a famous pet-type robot, which was developed in Japan and filed with the Korean Intellectual Property Office and disclosed with Korean Patent Publication No. 2000-7015057 (Applicant: Sony Corporation, Nobuyuki Idei).

The method disclosed in the publication has many similar features to the present invention. For example, the prior-art method is implemented based on a modularized robot to meet various demands of consumers, and separately manages hardware-dependent software and hardware-independent software and also supports late binding of software.

DISCLOSURE OF INVENTION

Technical Problem

However, the first deficiency of the prior-art method is a lack of openness. The prior-art method can be carried out only in a specific hardware platform, and does not involve a software framework for interoperability between heterogeneous platforms. Actually, an architecture or method for implementing middleware for openness as in the present invention has not yet been disclosed.

The second deficiency of the prior art-method is a lack of the generality that autonomous robot software architectures have. The robot control software architecture disclosed in the publication cannot be used as a general autonomous robot control architecture in a broad sense since it is limited to a specific application, i.e., a pet-type robot. Also, elements required to construct a general-purpose autonomous robot control architecture in a distributed environment have not yet been disclosed.

To make it possible to manufacture a consumer-oriented robot through combination of independent heterogeneous functional modules, it is necessary for the modules to each provide an interface standardized mechanically, electrically, and in software, and also to be interoperable when they are combined.

For software, it is difficult to provide a standardized interface or to achieve interoperability since software has a wide variety of forms depending on hardware or operating systems. In addition, taking into account that manufacturing companies employ unique technologies, it is not possible to impose limitations to operating systems or hardware used for manufacturing modules for the purpose of standardization.

Therefore, the present invention has been made in view of the above problems, and it is an object of the present invention to provide an open distributed processing structured robot control software architecture, which makes it possible to mass-produce autonomous robots in units of interoperable functional modules and which is also suitable for manufacturing a wide variety of robot products in small quantities since the development procedures are independent and specialized.

It is another object of the present invention to provide an open distributed processing structured robot control software architecture, which allows integration of various types of distributed software and ensures autonomy and real-time performance of autonomous robots in a distributed environment.

The following are features of the present invention.

First, robots can be modularized as functional components, and modules can be independently developed without taking into account the assembled state.

Second, a robot can be constructed through combination of the developed modules, and software present in each module is provided in the form of a component, which supports a late binding scheme and allows maintenance and repair, and also allows module-by-module upgrade.

Third, construction of a user-oriented robot through combination of modules, replacement of modules, and module-by-module upgrade are carried out from the viewpoint of system integrators, and system integrators can perform system integration design according to the demands of users without technical knowledge of robots.

Fourth, a robot constructed through combination of distributed modules in the above manner is able to have autonomy through reasoning and learning and also guarantees inherently required real-time performance.

Technical Solution

In accordance with the present invention, the above and other objects can be accomplished by the provision of an open distributed processing structured robot control software architecture for constructing a robot by combination of a plurality of independent heterogeneous modules based on a network, the robot control software architecture comprising: software components operating in an independent and distributed fashion under a multitasking operating system; spec files capable of being uploaded and downloaded according to a request of the outside, the spec files being standardized for the software components; virtual machines corresponding respectively to the software components, the virtual machines activating the respective software components under a multitasking operating system; communication middleware for providing a communication path for operation and communication of the software components and a function description language for implementation of the software components; a task language for providing a distributed-software integration function through late binding of interfaces of distributed software components based on XML as a standard language for Internet services, the task language being uploaded to a robot on a wide area network such as the Internet or a local area network, on which the robot is installed, so as to provide a user-oriented interface service according to a request of the user; and a real-time channel manager for analyzing information of late binding of the software components described in the task language, and obtaining substantial physical addresses to perform interprocess communication in the virtual machines or network communication between the virtual machines, the real-time channel manager managing real-time channel usage time of the software components through cooperation of multitasking operating system scheduling and network scheduling.

Preferably, each of the software components includes a function interface for providing an interface for activation, stopping, and setting in a robot control executive level, and input and output variable interfaces for providing a mutual control information transfer interface between the software components, and each of the software components provides a programming function employing a component interface and a source code interface implemented in an independent robot function description language.

Preferably, each of the virtual machines includes a message queue for communication between the software components in a distributed environment, wherein access to the message queue is gained through the real-time channel manager, and each of the virtual machines provides an interface and a source code inside the module.

Preferably, the middleware includes a lower level serving to provide communication in an environment of various heterogeneous networks, and a higher layer serving to provide standardized services regardless of the type of network environment of the lower layer, wherein access to the middleware is gained through the real-time channel manager.

Preferably, the real-time channel manger uses a Quality of Service (QoS)-based resource allocation scheme for real-time channel allocation, the QoS-based resource allocation scheme being used to optimize usage of available resources inside a distributed system.

Advantageous Effects

An open distributed processing structured robot control software architecture according to the present invention makes it possible to mass-produce autonomous robots in units of interoperable functional modules. Specialization is ensured since manufacturers only have to develop and produce specific functional modules rather than the entirety of the robot system. This makes it possible to accelerate technology development and also to achieve cost reduction through mass production of specific modules. Various demands of consumers can be met since consumers can assemble desired robots by combining functional modules provided in various forms. This makes it possible to expand the robot market as a whole.

BRIEF DESCRIPTION OF THE DRAWINGS

FIG. 6 is an illustrative diagram showing a software component constructed using a component interface and a source code interface implemented in a function description language.

BEST MODE FOR CARRYING OUT THE INVENTION

An embodiment of the present invention will now be described with reference to the accompanying drawings.

Figure 1:
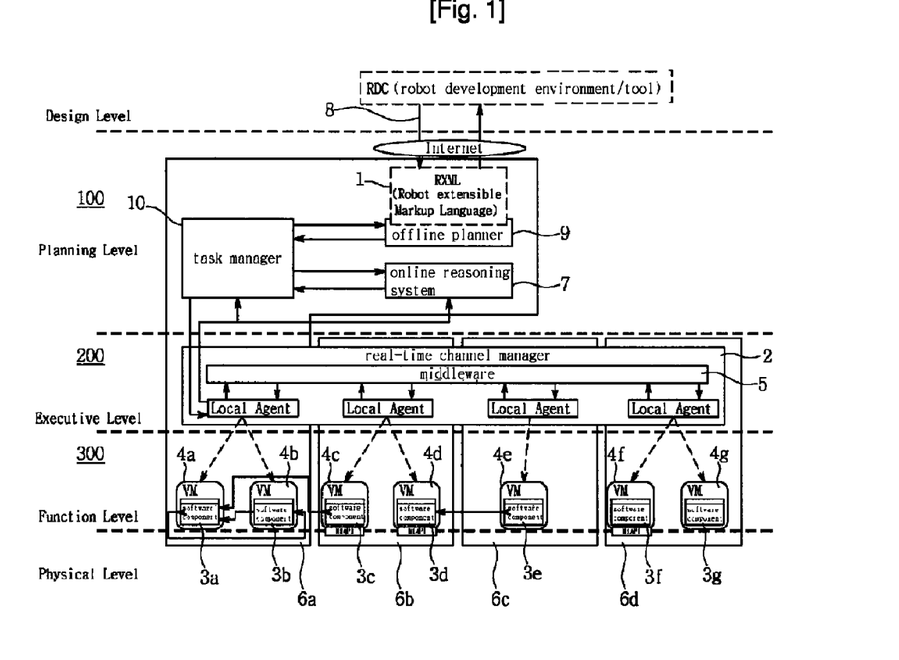
FIG. 1 is a software architecture diagram showing a hierarchical arrangement of elements of a control system according to the present invention.

FIG. 1 is a diagram showing a hierarchical arrangement of elements of an open distributed autonomous robot control system according to the present invention.

As shown in FIG. 1, the autonomous robot control system according to the present invention has a 3-tier hybrid structure comprising a robot control planning level 100, a robot control executive level 200, and a robot control function level 100. Features of the present invention, which are distinguished from the conventional 3-tier autonomous robot control structure, include a task language (or task description language) 1, which provides a system integration function and openness based on the Internet; a real-time channel manager 2 in a distributed environment; virtual machines 4 (4a, 4b, 4c, 4d, 4e, 4f, 4g) as platform-independent operating environments of software components 3 (3a, 3b, 3c, 3d, 3e, 3f, 3g), which are independent functional entities; communication middleware 5 used for operation and communication of the software components 3 (3a, 3b, 3c, 3d, 3e, 3f, 3g) and a function description language for implementation of the software components 3 (3a, 3b, 3c, 3d, 3e, 3f, 3g); development of independent modules 6 (6a, 6b, 6c, 6d) which constitute a robot; and development of a robot through combination of the modules 6 (6a, 6b, 6c, 6d). The features of the present invention will now be described in detail.

The task language 1 of the robot control planning level 100 has a format, an operating method, and content which are distinguished from those of conventional task languages. The purpose of the conventional task language was only to apply it with ease when a change occurs in a task using a robot by a robot operator at an industrial site, so that the conventional task language has been developed into a closed form based on the manufacturing company.

The task language 1 according to the present invention provides functions common to conventional task languages. These functions include an execution synchronization assignment function, an event processing function, a conditional sentence generation and processing function, an exception processing function, a function to interface with the user, and a function to interface with an online reasoning function 7. The task language 1 is produced using grammar representing such features, and is uploaded (denoted by "8") to a robot over a wide area network such as the Internet or a local area network on which the robot is installed. Further, an offline planner 9 parses the uploaded task language 1, so that it is divided into independent execution units, and thereafter the uploaded task language 1 is transmitted to a task manager 10, so that the real-time channel manager 2 in the robot control executive level 200 finally executes it.

Figure 2:
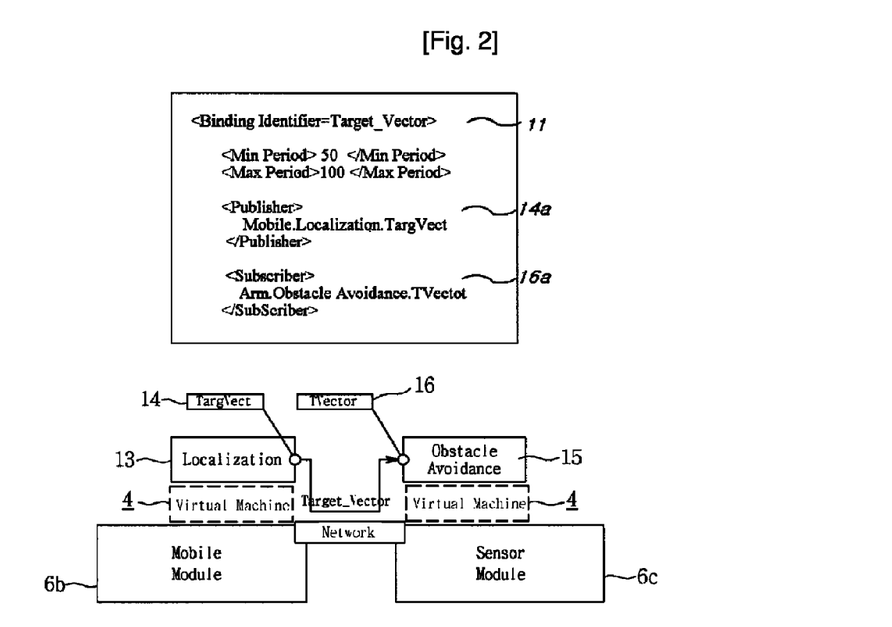
FIG. 2 is an illustrative diagram showing integration of software components using a task language.

A first feature of the task language 1 according to the present invention is openness. The task language 1 according to the present invention formally has standardized grammar since the task language 1 is based on eXtensible Markup Language (XML) that has already been used as a standard language for Internet services in the information industry as shown in FIG. 2. The task language 1 according to the present invention is also characterized by easy upload (denoted by "8") through a wide area network such as the Internet for flexible access environments since a system integration process for combining the modules 6 (6a, 6b, 6c, 6d) into a robot is performed after the modules 6 (6a, 6b, 6c, 6d) are sold.

A second feature of the task language 1 according to the present invention is a distributed-system integration function. The task language 1 according to the present invention has two stages of development procedure for determining description of a mission, which is defined as sequential or conditional execution of a task, and task execution strategies of software components 3 (3a, 3b, 3c, 3d, 3e, 3f, 3g). Particularly, the task language 1 according to the present invention provides a function for late binding of the interfaces of the software components 3 (3a, 3b, 3c, 3d, 3e, 3f, 3g), which are independent functional entities provided respectively inside the distributed modules 6 (6a, 6b, 6c, 6d), thereby providing a maintenance and repair function and a task generation function through a system integration process. Such standardized system integration is performed through the real-time channel manager 2 and is based on the virtual machines 4 (4a, 4b, 4c, 4d, 4e, 4f, 4g) and the communication middleware 5 at the lower levels, which will be described below. An example of the system integration is shown in FIG. 2.

As shown in FIG. 2, communication channels 11 and 12 entitled 'Target-Vector' serve as channels for transferring outputs 14 and 14a, entitled 'TargVect', of a software component 13, entitled 'Localization', of a mobile module 6b to inputs 16 and 16a, entitled 'Tvector', of a software component 15, entitled 'Obstacle Avoidance', of a sensor module 6c. Since the establishment of these channels is defined when the task language 1 of the robot is produced, the system integration function is provided through late binding.

A third feature of the task language 1 according to the present invention is the provision of a user-oriented interface over the Internet. In the conventional robot control system, the task language and the user interface are provided independently of each other.

On the contrary, since the task language 1 according to the present invention is formally based on XML, it is possible to provide and perform the Internet-based user interface on a standardized web browser, and, accordingly, it is possible to use Internet interface techniques in the information technology field without alteration. In addition, user-oriented interface design as demanded by the user is achieved since the interface design is carried out simultaneously with task planning. The offline planner 9 provides the service of the user interface defined in the task language 1 by serving as a server in such a manner that the offline planner 9 receives a task execution result back from the task manager 10 and provides the received task execution result to the wide area network or to the local area network.

Figure 3:
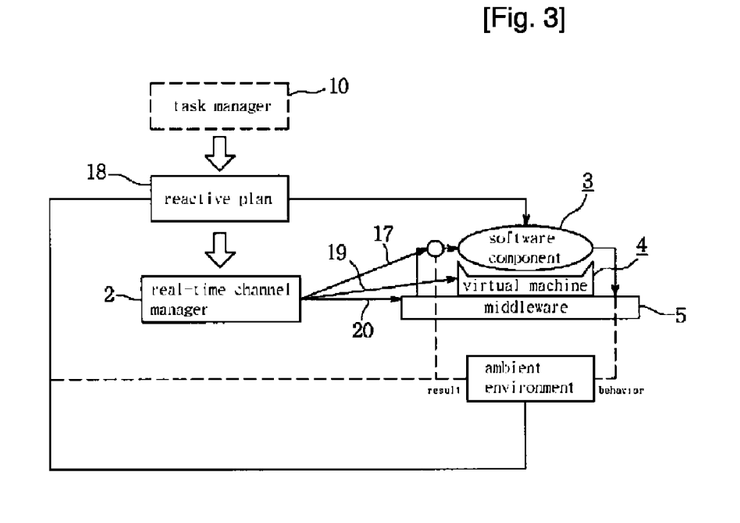
FIG. 3 is a diagram showing functions of a real-time manager that is applied to the present invention.

The purpose of the real-time channel manager 2 in the robot control executive level 200 shown in FIG. 1 is to guarantee real-time performance in the network distributed environment and the multitasking operating system in the conventional autonomous robot control architecture. The real-time channel manager 2 is an entity that analyzes information of late binding of the software components 3 (3a, 3b, 3c, 3d, 3e, 3f, 3g) described in the task language 1 and obtains substantial physical addresses to perform inter-process communication in the modules 6 (6a, 6b, 6c, 6d) or network communication between the modules 6 (6a, 6b, 6c, 6d). Such communication is performed in accordance with priorities, and real-time end-to-end channels can be assigned and released, in conjunction with multiple operating system scheduling and network scheduling, in order to guarantee real-time communication between the software components 3 (3a, 3b, 3c, 3d, 3e, 3f, 3g). This communication is performed on the middleware 5 at the lower level. The real-time channel manager 2 is the only entity that can substantially use a communication path provided by the middleware 5 in the autonomous robot architecture. The functions of the real-time manager 2 are shown in FIG. 3.

Channels provided by the real-time channel manager 2 include a one-to-one single channel, a multiple-input single channel, or single-input multiple-output, multiple-input multiple-output, or multiple-input multiple-output multiple channels. In the case of multiple channels, the real-time channel manager 2 has a function 17 to perform fusion based on execution values. The execution values are determined by a reactive plan 18 in the robot control planning level 100, and the real-time channel manager 2 determines sensory fusion and effector fusion strategies online based on the determined execution values. The reactive plan 18 may be explicitly determined in the offline planner 9 by the developer of the task language 1 or may be achieved through probabilistic determination or learning of the online reasoning system 7.

The real-time channel manger 2 uses a Quality of Service (QoS)-based resource allocation scheme for real-time channel allocation in order to optimize the use of limited available resources inside the distributed system, and the determination of requested QoS is made by the reactive plan 18 in the robot control planning level 100 since the determination of requested QoS is based on execution values as with fusion.

In addition, the real-time channel manager 2 optimizes the time when each software component 3 uses a real-time channel, through coordination of the multitasking operating system scheduling 19 and the network scheduling 20. The coordination of the multitasking operating system scheduling 19 and the network scheduling 20 is a technique for minimizing an unnecessary standby time caused by asynchronous operation of both the scheduling 19 and 20. This is accomplished by changing scheduling of processes to be performed prior to the arrival time of periodically performed tasks of the multitasking operating system or periodically generated messages. Here, in the case of a network message, a transmitter operating system task is performed prior to the arrival time, and, in the case of a receiver operating system task, the generation of a network message is performed prior to the arrival time. The real-time channel manager 2 can secure as man available real-time channels as possible by minimizing the software end-to-end transfer time through such a channel management technique.

The software components 3 (3a, 3b, 3c, 3d, 3e, 3f, 3g) in the robot control function level 300 shown in FIG. 1 are independent software functional units. The software components 3 (3a, 3b, 3c, 3d, 3e, 3f, 3g) are operated by the virtual machines 4 (4a, 4b, 4c, 4d, 4e, 4f, 4g), so as to guarantee software compatibility in heterogeneous platform environments and also to allow a system integrator to add software components 3 (3a, 3b, 3c, 3d, 3e, 3f, 3g) specific to the user. If the virtual machines 4 (4a, 4b, 4c, 4d, 4e, 4f, 4g) are used, content for implementation, which is to be coded in a robot function description language described below, is realized by software. Therefore, if breakpoints are used or if stepwise executions are carried out, it is easy to correct program errors through the virtual machines 4 (4a, 4b, 4c, 4d, 4e, 4f, 4g) and also to change the hardware structure. If the virtual machines 4 (4a, 4b, 4c, 4d, 4e, 4f, 4g) are operated under the multitasking operating system, it is possible to realize an environment in which a number of virtual machines 4 (4a, 4b, 4c, 4d, 4e, 4f, 4g) operate simultaneously, and therefore it is possible to operate a number of software components 3 (3a, 3b, 3c, 3d, 3e, 3f, 3g) in a single independent module 6 (6a, 6b, 6c, 6d) under the multitasking operating system. Such a system of virtual machines 4 (4a, 4b, 4c, 4d, 4e, 4f, 4g) makes it easy to develop platform-independent software and also to provide an interface with source code inside the modules 6 (6a, 6b, 6c, 6d), thereby allowing development of platform-dependent software. Such an internal source code is used when producing a robot hardware control program or is used for implementing a large-scale computation program that requires fast computation.

Figure 4:
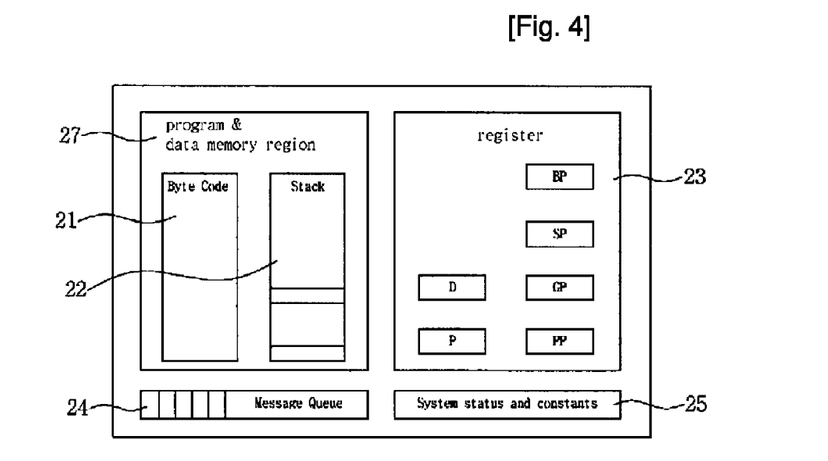
FIG. 4 is a diagram showing the configuration of a virtual machine that is applied to the present invention.

The virtual machines 4 (4a, 4b, 4c, 4d, 4e, 4f, 4g) of the robot control function level 300, each of which is a simulated unit of a general Central Processing Unit (CPU), have memory regions. An example of the memory architecture of the virtual machines 4 (4a, 4b, 4c, 4d, 4e, 4f, 4g) is shown in FIG. 4. Each of the virtual machines 4 (4a, 4b, 4c, 4d, 4e, 4f, 4g) has a stack region 22 and a bytecode region 21, corresponding to a program memory, as with the CPU having an internal memory, and has its own execution time data storage region such as a register memory 23. Each of the virtual machines 4 (4a, 4b, 4c, 4d, 4e, 4f, 4g) in the robot control software architecture disclosed in the present invention is characterized by additionally including a message queue 24 for use in communication between the software components 3 (3a, 3b, 3c, 3d, 3e, 3f, 3g) in the distributed environment. The real-time channel manager 2 gains access to the message queue 24. Further, each of the virtual machines 4 (4a, 4b, 4c, 4d, 4e, 4f, 4g) additionally has a storage region 25 capable of storing its status indicators and setting values. The memory used in the virtual machines 4 (4a, 4b, 4c, 4d, 4e, 4f, 4g) also includes a heap region 27 which can be freely assigned and released within a space of the memory left after assignment to the bytecode region 21 and the stack region 22. Bytecodes, which will be executed in the virtual machines 4 (4a, 4b, 4c, 4d, 4e, 4f, 4g), are accumulated in the bytecode region 21, and local variables inside a function or for a function call and global variables are stored in the stack region 22. A memory space used by variables having a variable size during execution of program is assigned to the heap region 27.

Each of the virtual machines 4 (4a, 4b, 4c, 4d, 4e, 4f, 4g) includes 6 (BP, SP, GP, PP, P, and S) registers 23 having a size of 32 bits, and a D register 23 capable of storing data types and data together. The BP, SP, GP, PP, and P registers 23 have a reference address for accessing the stack 22 or an address of a currently processed bytecode. The registers 23 serve as follows:

The Base Pointer (BP) register is used for addressing in the stack 22. The BP register typically assigns a base address for referring to a local variable in a function.

The Stack Pointer (SP) register is used for addressing in the stack 22. The value of the SP resister is automatically increased and decreased in the course of pushing/popping data on and off the stack.

The Global Pointer (GP) register is used to address data in the stack 22. The GP register typically assigns a base address for referring to a global variable.

The Pointer (P) register is used for addressing in the memory 23. For a reference value of the P register, addressing is possible without discriminating between the bytecode region 21, the stack region 22, and the heap region 27.

The Program Pointer (PP) register is used to address a next bytecode to be processed.

The Data (D) register is used to store data for determination or a return value from a function.

The Status (S) register indicates the states of the virtual machines 4 (4a, 4b, 4c, 4d, 4e, 4f, 4g).

The stack 22 has a Last In First Out (LIFO) structure, and a new item can be added to and an existing item can be deleted from the stack 22 at only one of the two ends thereof. The virtual machines 4 (4a, 4b, 4c, 4d, 4e, 4f, 4g) do not use registers in transferring arguments since the virtual machines 4 (4a, 4b, 4c, 4d, 4e, 4f, 4g) operate based on the stack 22. The operation method based on the stack 22 allows simple and concise design of bytecodes. Even if they have the same add operator (+), instructions of the virtual machines 4 (4a, 4b, 4c, 4d, 4e, 4f, 4g) are compiled into different instructions depending on data types of operands. For example, an iadd instruction is used for integer operands, and when the instruction is executed, two 4-byte values are extracted from the stack 22 and the two extracted 4-byte values are then subjected to the operation, and then the result of the operation is stored in the stack 22. On the other hand, an fadd instruction is used for real operands, and when the instruction is executed, two 8-byte values are extracted from the stack 22 and the two extracted 8-byte values are then subjected to the operation, and then the result of the operation is stored in the stack 22.

The heap region 27 is a space for storing string data having a variable size. The heap region 27 uses a space of the memory left after allocation to the space for bytecodes and the stack 22.

The bytecode region 21 is part of the memory for storing actual program instructions, and the instructions stored in the bytecode region 21 are executed by an executor. The bytecode is a compiled code of the program.

Figure 5:
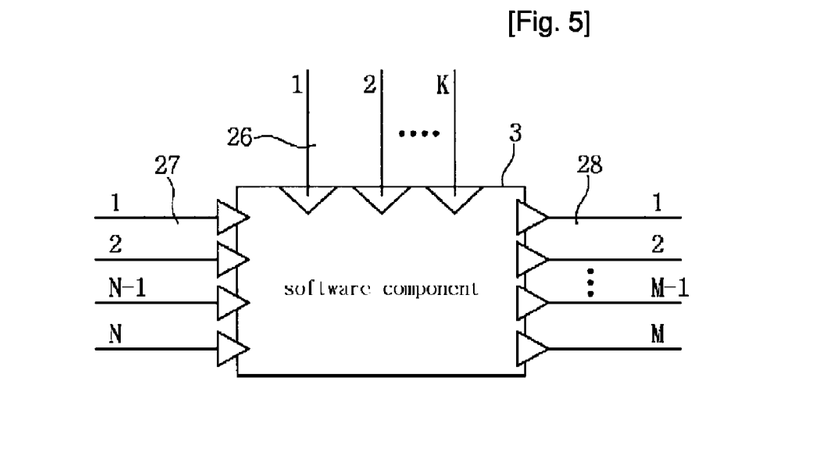
FIG. 5 is a diagram showing the configuration of interfaces of software components that are applied to the present invention.

The interface information is information about functions and variables known to the outside in a control procedure carried out by the virtual machines 4 (4a, 4b, 4c, 4d, 4e, 4f, 4g). When the virtual machines 4 (4a, 4b, 4c, 4d, 4e, 4f, 4g) read an executable file, the virtual machines 4 (4a, 4b, 4c, 4d, 4e, 4f, 4g) also read the interface information. A function and variables declared in an interface are known to the outside with a unique interface ID. Outside, interface IDs are used as bases for discriminating between function interfaces 26 and variable interfaces 27 and 28 of the software components 3 (3a, 3b, 3c, 3d, 3e, 3f, 3g) executed in the virtual machines 4 (4a, 4b, 4c, 4d, 4e, 4f, 4g). In the case of the function interface 26, the interface information includes the interface ID of a function, an argument data type, a return data type, and the location of the function on a program loaded in the bytecode region 21. In the case of the variable interface, the interface information includes the interface ID of a variable, a data type of the variable, and the location of a portion of the stack region 22 to which the variable is allocated.

If two virtual machines 4A and 4B are present, the message queue 24 is used when the virtual machine 4A calls a function interface in the virtual machine 4B. The message queue 24 operates in a FIFO fashion. The virtual machine 4 periodically checks the message queue 24 while a program is being executed in the virtual machine 4. If the virtual machine 4 detects function call information, the virtual machine 4 stops the currently executed program, and shunts register information, which has been used in the program, to the stack 22, and then carries out the function call of the message queue 24. If the function call is completed, the virtual machine 4 receives the register information back from the stack 22, and executes the program, which was being executed. The function call information includes the name of a calling module, which has called the function, the serial number of a calling virtual machine, which has called the function, the ID of the function, and an actual argument of the function.

The software components 3 (3a, 3b, 3c, 3d, 3e, 3f, 3g) operated by the virtual machines 4 (4a, 4b, 4c, 4d, 4e, 4f, 4g) provide functions and input and output variables to the interfaces. FIG. 5 shows an interface structure diagram of the unit software components 3 (3a, 3b, 3c, 3d, 3e, 3f, 3g). The function interface 26 provides an interface for activation, stopping, and setting in the executive level 200, and the input variable interface 27 and the output variable interface 28 provide a mutual control information transfer interface between the software components 3 (3a, 3b, 3c, 3d, 3e, 3f, 3g). The function interface 26 between the software components 3 (3a, 3b, 3c, 3d, 3e, 3f, 3g) is not provided for guaranteeing real-time performance of the software components 3 (3a, 3b, 3c, 3d, 3e, 3f, 3g). The software components 3 (3a, 3b, 3c, 3d, 3e, 3f, 3g) are divided into open/standard software components and non-standard software components.

The open/standard software components 3 (3a, 3b, 3c, 3d, 3e, 3f, 3g) are standardized software components 3 which are installed in the corresponding independent functional modules 6 (6a, 6b, 6c, 6d) and have a function and interface architecture complying with standardized rules. The function standardization provides a protocol of operations performed by the modules 6 (6a, 6b, 6c, 6d) when the modules 6 (6a, 6b, 6c, 6d) use the interfaces provided by the software components 3 (3a, 3b, 3c, 3d, 3e, 3f, 3g) in order to provide independent functional services. The interface architecture standardization is standardization of interface specifications required for coordination of the software components 3 (3a, 3b, 3c, 3d, 3e, 3f, 3g) present inside the independent functional modules 6 (6a, 6b, 6c, 6d). The interface standardization is classified into standardization of the function interface 26 and standardization of the variable interfaces 27 and 28. The standardization of the function interface 26 is standardization of the minimum number of function interfaces 26 of the software components 3 (3a, 3b, 3c, 3d, 3e, 3f, 3g), the respective functions thereof, the number of arguments, argument types, and returned-value types. The standardization of the variable interfaces 27 and 28 is standardization of the minimum number of variable interfaces 27 and 28 of the software components 3 (3a, 3b, 3c, 3d, 3e, 3f, 3g), the respective functions thereof, and variable types.

The non-standard software components 3 (3a, 3b, 3c, 3d, 3e, 3f, 3g) are software components aimed to provide services, which are additionally provided by the module manufacturing company, or software components that are additionally installed by the user during the system integration procedure. There is no limitation on the function and interface architecture of the non-standard software components 3 (3a, 3b, 3c, 3d, 3e, 3f, 3g).

All the independent functional modules 6 (6a, 6b, 6c, 6d) store therein standardized spec files of the software components 3 (3a, 3b, 3c, 3d, 3e, 3f, 3g) provided inside the independent functional modules 6 (6a, 6b, 6c, 6d). The spec files can be uploaded and downloaded according to the request from the outside. The spec files essentially include the following content.

(1) The spec files include a list of the software components 3 (3a, 3b, 3c, 3d, 3e, 3f, 3g) installed in the modules 6 (6a, 6b, 6c, 6d), and the respective types and version information thereof. The types of the software components 3 (3a, 3b, 3c, 3d, 3e, 3f, 3g) indicate standardization type numbers if they are standardized software components, and indicate software type numbers specified by the creator if they are non-standardized software components.

(2) The spec files include a list of the respective interface architectures of the software components 3 (3a, 3b, 3c, 3d, 3e, 3f, 3g). The interface architecture list indicates the characteristics of the interfaces such as the respective names and data types of the interfaces.

(3) The spec files include information of the modules 6 (6a, 6b, 6c, 6d) that is maintained and managed by the modules 6 (6a, 6b, 6c, 6d). The information of the modules 6 (6a, 6b, 6c, 6d) represents their hardware structure, hardware status, and physical connection relationship with other modules 6.

The spec files, which have been stored in the modules 6 (6a, 6b, 6c, 6d), are downloaded to a brain module, and transferred to an integrated development environment via a wide area network, so that the spec files are used like a general software Application Program Interface (API) when producing a task description file using the task language 1. When there is a need to change the spec files due to addition, deletion, change, etc., of the software components 3, the spec files are changed in the integrated development environment, and the changed spec files are transferred back to the brain module via the wide area network, after which the spec files are uploaded to the modules 6.

(4) The spec files include an independent function description language that is interpreted and executed in the virtual machines 4 (4a, 4b, 4c, 4d, 4e, 4f, 4g) in order to implement the software components 3 (3a, 3b, 3c, 3d, 3e, 3f, 3g), which are independent functional software units operating on the virtual machines 4 (4a, 4b, 4c, 4d, 4e, 4f, 4g) according to the present invention. The independent function description language is interpreted into code by a dedicated compiler, and the interpreted code is executed by the virtual machines 4 (4a, 4b, 4c, 4d, 4e, 4f, 4g). Although the interpreted code has a similar form to hardware processor machine code, the interpreted code has a platform-independent property since it operates on the virtual machines 4 (4a, 4b, 4c, 4d, 4e, 4f, 4g).

The robot function description language has formal and material properties common to general advanced program languages. A first feature of the robot function description language is that it does not provide a method for directly accessing hardware as a pointer does. The method for directly accessing hardware is implemented only through a source code interface provided by the virtual machines 4 (4a, 4b, 4c, 4d, 4e, 4f, 4g). This avoids the possibility that a module developer, who is a novice at the lower platform, may damage hardware stability due to program errors.

A second feature of the robot function description language is that it provides component interfaces, which can be provided to the outside, and also provides a programming function employing an external component interface.

An example of software components 3 (3a, 3b, 3c, 3d, 3e, 3f, 3g) employing a component interface 30 and a source code interface 29 implemented in the function description language is shown in FIG. 6. As shown in FIG. 6, an interface function 31, an interface input variable 32, and an interface output variable 33 of the software components 3 (3a, 3b, 3c, 3d, 3e, 3f, 3g) have the same function and variable usage as those inside the modules 6 (6a, 6b, 6c, 6d). This provides the module developer with the same transparent development environment as programming in a single environment instead of programming in a distributed processing structure.

Figure 7:
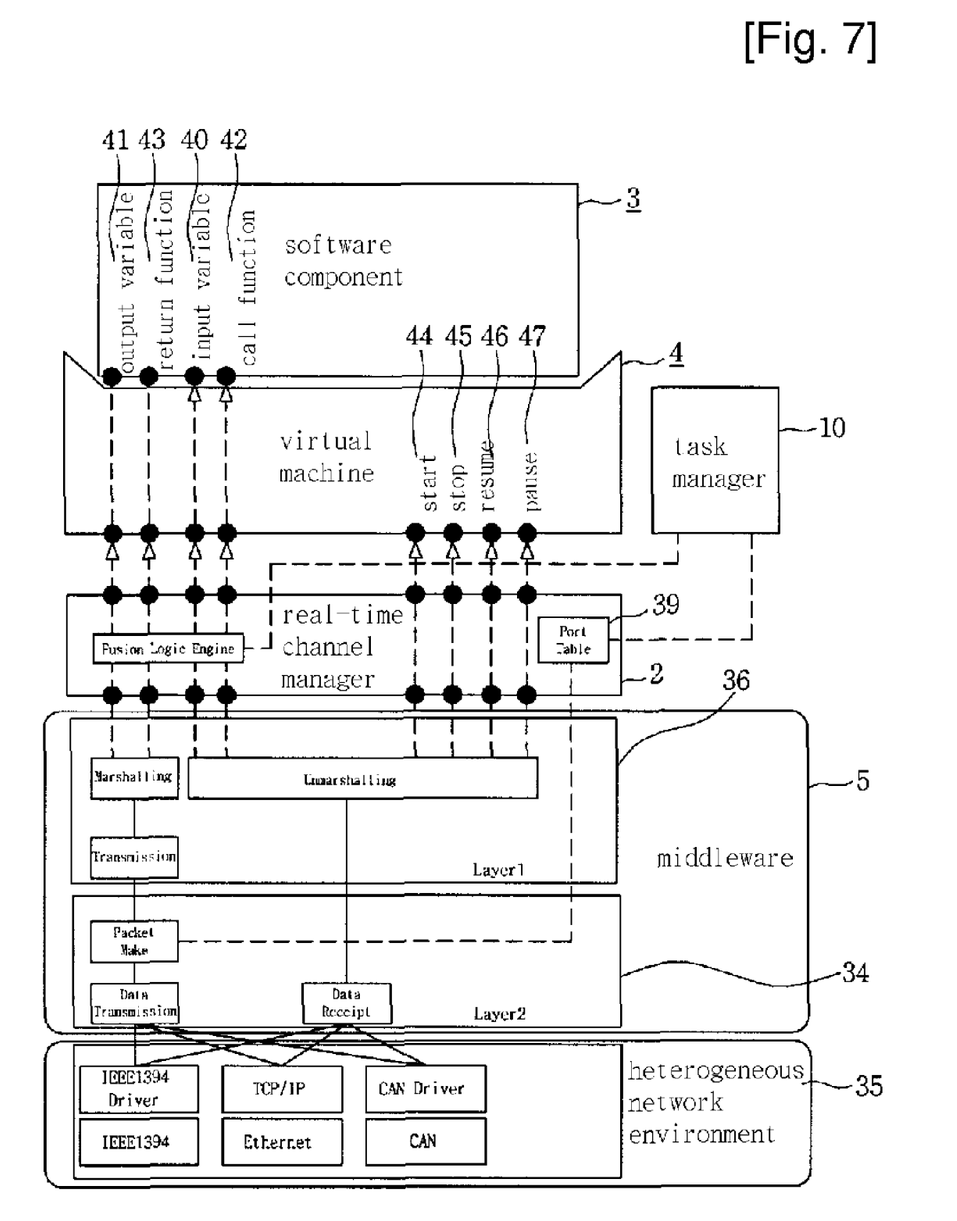
FIG. 7 is a diagram showing functions of middleware in an autonomous robot control architecture according to the present invention.

In the present invention, paths for communication between external components of the modules 6 and for communication between internal components of the modules 6 are provided through the middleware 5. Functions of the middleware 5 in the autonomous robot control architecture according to the present invention are shown in FIG. 7.

The middleware 5 is internally divided into two layers 34 and 36. The lower level 34 of the middleware 5 serves to provide communication in an environment 35 of various heterogeneous networks. The higher layer 36 of the middleware 5 serves to provide standardized services regardless of the type of network environment of the lower layer 34 of the middleware 5. As described above, the real-time channel manager 2 alone uses the service of the middleware 5 in the robot control architecture according to the present invention. When using the service, the real-time channel manager 2 produces a port table 39 using physical transport address information of a message received from the task manager 10, and notifies the middleware 5 of information of the port table 39 when using the service of the middleware 5.

Similar to other general middleware, the middleware 5 provides functions to read and write (40, 41) component input and output variables for communication of the component interface 30, and functions to call and return (42, 43) the component interface function 31.

The middleware 5 according to the present invention is characterized by providing Activate (44), Stop (45), Resume (46), Pause (47), and Delete functions, etc., of the virtual machines 4 which are operating environments of the software components 3. First, these functions are used for loading, and maintenance and repair of new software components 3. Second, these functions are used for real-time debugging.

The above embodiments are merely examples for implementing an open distributed processing structured robot control software architecture according to the present invention. The present invention is not limited to the above embodiments, and various modifications are possible by a person having ordinary knowledge in the art without departing from the spirit of the invention.

INDUSTRIAL APPLICABILITY

As described above, an open distributed processing structured robot control software architecture according to the present invention makes it possible to mass-produce autonomous robots in units of interoperable functional modules. Specialization is ensured since manufacturers only have to develop and produce specific functional modules rather than the entirety of the robot system. This makes it possible to accelerate technology development and also to achieve cost reduction through mass production of specific modules. Various demands of consumers can be met since consumers can assemble desired robots by combining functional modules provided in various forms. This makes it possible to expand the robot market as a whole.

The invention claimed is:

1. A computer memory for storing an open distributed processing structured robot control software architecture for constructing a robot by combination of a plurality of independent heterogeneous modules based on a network, the robot control software architecture comprising:

software components operating in an independent and distributed fashion under a multitasking operating system;

spec files capable of being uploaded and downloaded according to a request of a user the spec files being standardized for the software components;

virtual machines corresponding respectively to the software components, the virtual machines activating the respective software components under a multitasking operating system;

communication middleware for providing a communication path for operation and communication of the software components and a function description language for implementation of the software components;

a task language for providing a distributed-software integration function through late binding of interfaces of distributed software components based on Extensible Markup Language as a standard language for Internet services, the task language being uploaded to a robot on a wide area network such as the Internet or a local area network, on which the robot is installed, so as to provide a user-oriented interface service according to the request of the user; and a real-time channel manager for analyzing information of late binding of the software components described in the task language, and obtaining substantial physical addresses to perform inter-process communication in the virtual machines or network communication between the virtual machines, the real-time channel manager managing real-time channel usage time of the software components through cooperation of multitasking operating system scheduling and network scheduling.

2. The robot control software architecture according to claim 1, wherein each of the software components includes a function interface for providing an interface for activation, stopping, and setting in a robot control executive level, and input and output variable interfaces for providing a mutual control information transfer interface between the software components.

3. The robot control software architecture according to claim 1, wherein each of the software components provides a programming function employing a component interface and a source code interface implemented in an independent robot function description language.

4. The robot control software architecture according to claim 1, wherein each of the virtual machines includes a message queue for communication between the software components in a distributed environment, wherein access to the message queue is gained through the real-time channel manager.

5. The robot control software architecture according to claim 1, wherein each of the virtual machines provides an interface and a source code inside the module.

6. The robot control software architecture according to claim 1, wherein the middleware includes a lower level serving to provide communication in an environment of various heterogeneous networks, and a higher layer serving to provide standardized services regardless of the type of network environment of the lower layer, wherein access to the middleware is gained through the real-time channel manager.

7. The robot control software architecture according to claim 1, wherein the real-time channel manger uses a Quality of Service (QoS)-based resource allocation scheme for real-time channel allocation, the QoS-based resource allocation scheme being used to optimize usage of available resources inside a distributed system.

* * * * *